L. McINNIS & D. E. SEMON.
PRESSURE INDICATOR FOR TIRES.
APPLICATION FILED JULY 13, 1916.
1,220,867.
Patented Mar. 27, 1917.
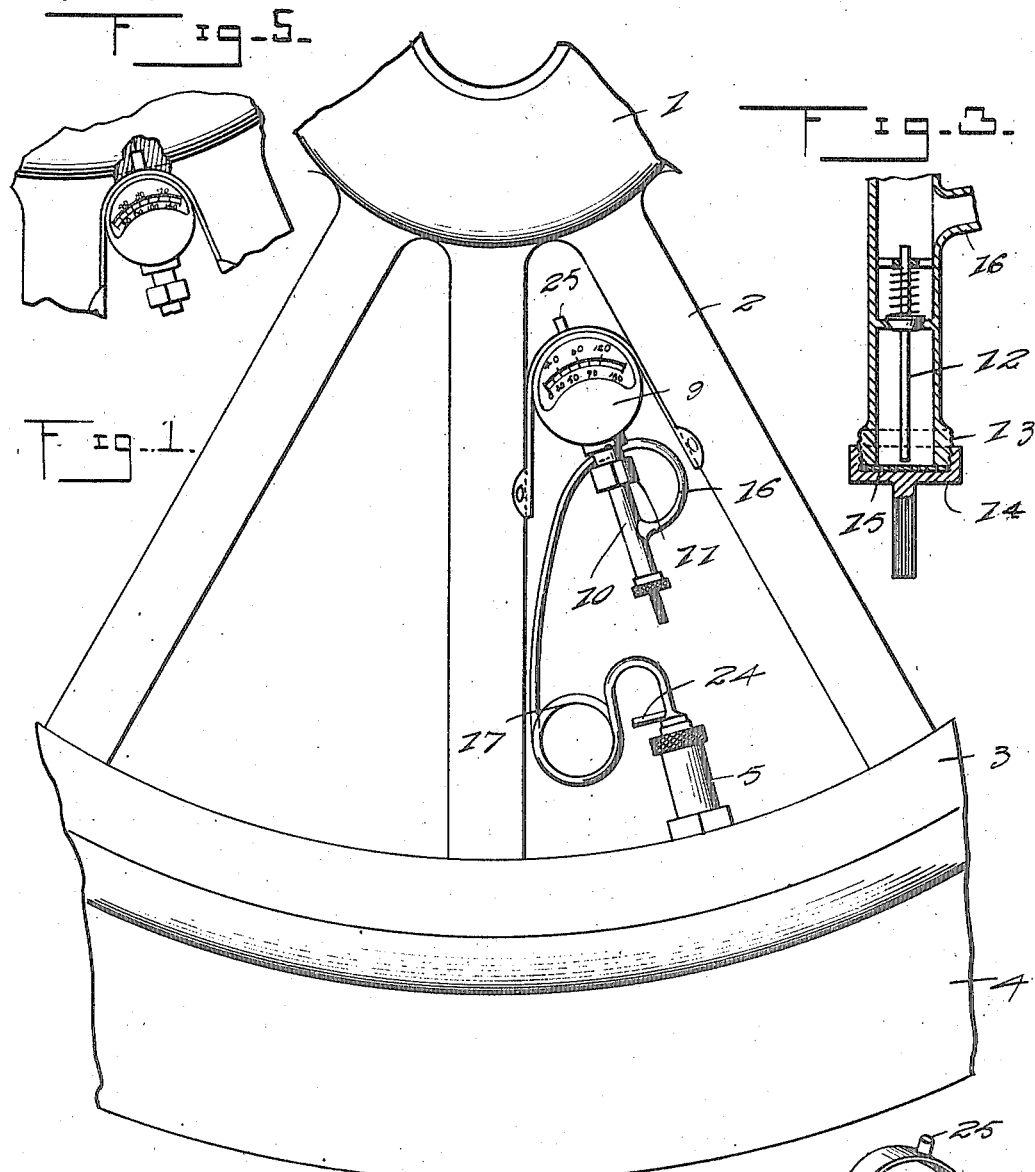
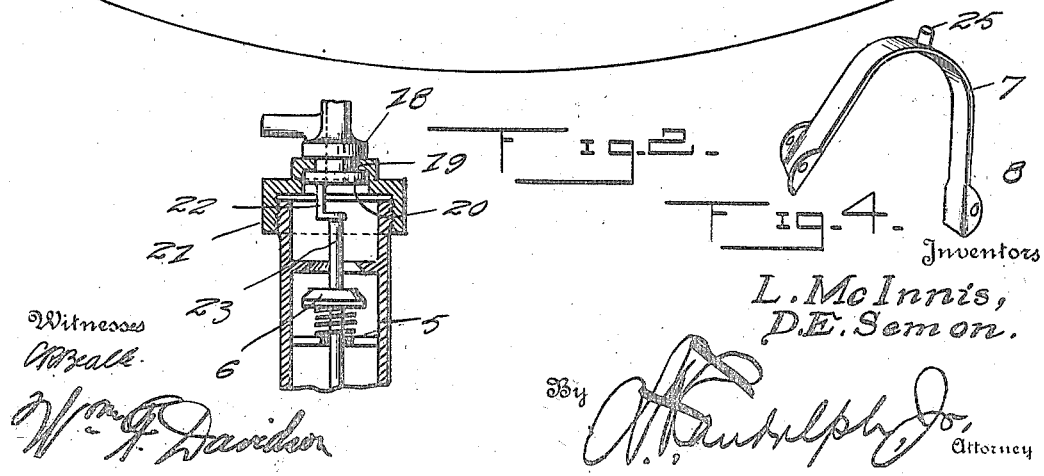
Inventors
L. McInnis,
D. E. Semon.

UNITED STATES PATENT OFFICE.

LAUCHLIN McINNIS AND DAVID E. SEMON, OF ST. PAULS, NORTH CAROLINA.

PRESSURE-INDICATOR FOR TIRES.

1,220,867. Specification of Letters Patent. Patented Mar. 27, 1917.

Application filed July 13, 1916. Serial No. 109,091.

*To all whom it may concern:*

Be it known that we, LAUCHLIN McINNIS and DAVID E. SEMON, citizens of the United States, residing at St. Pauls, in the county of Robeson and State of North Carolina, have invented certain new and useful Improvements in Pressure-Indicators for Tires; and we do hereby declare the following to be a full, clear, and exact description of the invention, such as will enable others skilled in the art to which it appertains to make and use the same.

This invention relates to new and useful improvements in a pressure indicator for tires and one of its objects is the provision of a device of this character, which shall be simple, durable and efficient, and which may be manufactured and sold at a comparatively low cost.

Another object of this invention is to provide a pressure gage secured to a wheel employing a pneumatic tire and so connected with the valve casing of the tire that the air within the tire will operate the gage to indicate the pressure of air within the tire at all times.

A further object of this invention is to provide a pipe connected with the gage and valve casing of a tire for conducting air from the tire to the gage and being wound in coil formation to provide a resilient connection which will absorb all vibrations and shocks occurring between the gage and the valve casing of the tire.

A still further object of this invention is to provide a resilient and substantially U-shaped bracket on the gage for securing the gage to the wheel at a point adjacent the valve casing of the tire.

With these and other objects in view as will become more apparent as the description proceeds, the invention consists in certain novel features of construction, combination and arrangement of parts as will be hereinafter more fully described and claimed.

For a complete understanding of our invention, reference is to be had to the following description and accompanying drawing, in which:—

Figure 1 is a front elevation of a pressure indicator for tires, constructed in accordance with our invention, and illustrating it applied to a wheel employing a pneumatic tire, Fig. 2 is a fragmentary sectional view of a valve casing of a tire, illustrating the connection between the pipe and the valve casing, Fig. 3 is a fragmentary sectional view of a valve casing or tube carried by the gage, Fig. 4 is a perspective view of the U-shaped bracket for supporting the gage, and Fig. 5 is a fragmentary view partly in sections and partly in elevation illustrating means for securing the bracket to the hub of the wheel.

Referring in detail to the drawing, the numeral 1 indicates a portion of the hub of a wheel, having a plurality of spokes 2 radiating therefrom and having a suitable rim or felly 3 secured to their outer ends. A pneumatic tire 4 is mounted upon the rim or felly 3 in the usual manner and has the usual valve casing 5 in which is mounted the valve 6 for controlling the inflow and outflow of air to the tire 4, and which is of the well known construction and to which our invention is applied.

A substantially U-shaped bracket 7 having a pair of ears 8 formed on each end thereof is positioned between a pair of the spokes 2 at any desired point and is secured to the spokes 2 by screws or rivets passing through the ears 8 into the spokes. The bracket 7 is constructed from resilient metal and has secured thereto a pressure gage 9 of any desired construction or type. A valve tube 10 has formed on one end a collar 11 which is threaded to the gage 9 and has mounted therein a self-closing valve 12. The other end of the tube 10 is enlarged and screw-threaded as illustrated at 13 to receive a cap 14 which has a packing 15 mounted therein for forming an airtight connection between the tube 10 and the cap 14. A flexible tube 16 constructed from any desired resilient metal is formed upon one side of the tube 10 and is wound in coil formation as illustrated at 17. The free end of the tube or pipe 16 is bent upwardly and downwardly and has an enlargement 18 formed thereon. An extension 19 is formed on the enlargement 18 and has formed thereon a collar 20 providing a space between the shoulder 20 and the enlargement to rotatably receive a coupling 21 which is internally screw-threaded to receive the upper end of the valve casing 5. An L-shaped arm 22 is formed on the collar 20 and depends downwardly therefrom within the coupling 21. As the coupling 21 is turned upon the valve casing 5, the L-shaped arm 22 engages the valve stem 23 of the valve 6 and unseats the valve, so that the air within the tire 4 may enter the tube or pipe 16 and then into the gage 9 for operating same, so that the pressure within the tire 4 may be readily determined by reading the gage 9.

A suitable handle 24 is formed on the tube or pipe 16 adjacent the enlarged portion 18. The handle is grasped to prevent the tube or pipe from being moved during the application of the coupling 21 to the valve casing 5. A lug 25 is formed upon the web portion of the U-shaped bracket 7, and is received in a socket formed in the hub 1 between the spokes 2 and at a point where they join the hub 1 for aiding in supporting the gage 9. This socket and lug 25 are only employed when the spokes 2 are sufficiently spaced apart at a point where they join the hub 1 so that the gage 9 may be positioned between the spokes so that the lug 25 will project into the socket.

In operation, when desiring to inflate the tire 4 the cap 14 is removed from the tube 10 and a pump is connected thereto, whereby the air may be forced into the pipe or tube 16 and then into the tire by way of the valve casing 5. As the pressure within the tire 4 increases, the degree of pressure will be indicated upon the gage 9. After the tire 4 has been inflated to a desired pressure, the pump is detached and the cap 14 threaded to the tube 10. The air within the tire 4 and the tube or pipe 16 is kept from escaping by the valve 12 within the tube 10, still allowing the pressure of air within the tire 4 to act upon the gage 9, whereby the pressure within the tire may be determined at all times.

While we have shown and described the preferred embodiment of our invention, it will be understood that minor changes in construction, combination and arrangement of parts may be made without departing from the spirit and scope of the invention as claimed.

Having thus described our invention, what we claim is:—

In combination, a wheel including a hub having spokes and a recess therein between two adjacent spokes and a pneumatic tire having an inflating valve, of a substantially U-shaped bracket located between said spokes and between the hub and said valve with its opened end opposite said valve, ears formed upon the ends of the arm portions of the brackets and secured to the spokes, a lug formed upon the web portion of the bracket and received within the recess, a gage carried by said bracket and a tube connecting said gage and inflating valve.

In testimony whereof we affix our signatures.

LAUCHLIN McINNIS.
DAVID E. SEMON.